United States Patent [19]

Rhine et al.

[11] 3,980,093

[45] Sept. 14, 1976

[54] TIMED PULSED FUEL INJECTION APPARATUS AND METHOD

[76] Inventors: Samuel Rhine, c/o Automotive Center, Texas State Technical Institute; Merle Robert Showalter, 205 Robins Loop, both of Waco, Tex. 76705

[22] Filed: May 14, 1975

[21] Appl. No.: 577,283

Related U.S. Application Data

[60] Continuation of Ser. No. 433,481, Jan. 15, 1974, abandoned, which is a division of Ser. No. 339,153, March 8, 1973, Pat. No. 3,810,581.

[52] U.S. Cl. ............................... 137/1; 137/624.13; 137/624.18; 222/225

[51] Int. Cl.$^2$ ......................................... F16K 11/00

[58] Field of Search .................. 137/624.13, 624.15, 137/624.18, 624.14, 625.11, 627, 1, 14; 239/89; 222/225, 366; 73/269, 262, 271; 138/30

[56] References Cited

UNITED STATES PATENTS

| | | | |
|---|---|---|---|
| 2,877,933 | 3/1959 | Downing | 137/624.24 UX |
| 3,083,871 | 4/1963 | Jepson | 222/41 |
| 3,394,733 | 7/1968 | Jacuzzi | 138/30 X |

*Primary Examiner*—Alan Cohan
*Attorney, Agent, or Firm*—Witherspoon and Lane

[57] ABSTRACT

A timed pulsed fuel injection device which meters fuel continuously and distributes flow pulses to *n* nozzles through a rotary distributor pressure cascading device which totally isolates the metering event from variations and dynamic effects in the *n* injection lines.

5 Claims, 9 Drawing Figures

EQUILIBRIUM CONDITION $$Pn = Pat - \frac{Kr}{a^2} fn^2$$

TIMED PULSED FUEL INJECTION APPARATUS AND METHOD

This application is a continuation of application Ser. No. 433,481, filed Jan. 15, 1974 now abandoned, which application in turn was a division of Ser. No. 339,153, filed March 8, 1973 now U.S. Pat. No. 3,810,581.

BACKGROUND AND OBJECTS

Timed, pulsed fuel injection systems are required for diesel engines and stratified charge engines and are very useful in conventional spark engines, particularly when air pollution control requires very accurate metering of fuel. However, pulsed fuel injection systems are difficult to design without metering errors due to wave effects in the system which result in dynamically caused errors (particularly for high pressure systems where the bulk modulus compressibility of the fuel becomes important and for very high speed systems). Systems which meter accurately cylinder-to-cylinder and cycle-to-cycle often lose calibration with time, and tend to be prohibitively expensive. Moreover, pulsed fuel injection systems tend to produce bad atomization at the very low speeds of engine startup: this problem has contributed to the cold startup problems with diesel engines which have persisted to some degree despite very extensive engineering effort.

It is a purpose of the present invention to produce a pulsed injection system which is simply connectable to air-fuel control logic, which produces extremely accurate metering from inexpensive components not built to high tolerances, and which continues to give good metering at all speeds even as the flow characteristics of the working parts vary with wear and deposits for the life of the engine. It is a further purpose to produce an injection system which is adaptable to very high pressure in-cylinder injection as well as to lower pressure applications.

It is another object of the present invention to produce an injection system which is totally insensitive to dynamic effects in the various injection lines and which produces excellent metering at any practical engine speed (at least up to approximately 15,000 RPM).

It is yet another object of the present invention to produce an injection system which is almost totally free of metering errors due to variations in injection lines and injection nozzles with varying flow pressure characteristics.

It is also an object of the present invention to produce an injection system which produces high instantaneous flow rates and good atmoization even during engine startup, and which provides a sharp cutoff of flow to prevent nozzle dripping.

It is another object of the invention to produce an injection pump where fuel flow is a linear function of control valve position, to simplify fuel-air ratio control logic design.

These and other objects are attained by producing a system where each working part has a geometrically simple shape and a mathematically well defined and simple function (in both the static and dynamic sense), by minimizing the complexity of each working part's function, by eliminating sources of interaction between the parts which produce second order metering errors, and by assuring that the distances of fluid pressure wave travel between the metering parts of the system are so small that the desired fluid equilibrium conditions between the operating parts are achieved during the time available even at the highest system operating speed.

Specifically, the pump has a pressurizing but not a metering function; total flow metering is done simply and continuously by a variable metering orifice across a constant pressure drop; and this total flow is divided into equal volumes and delivered in pulses by the interaction of three accumulator chambers interconnected in a pressure cascading sequence by a rotary distributor to the injection nozzles. Each accumulator, when it is opened to the downstream accumulator, discharges its volume as a sort of fluid capacitor, so that flow delivery even at very low engine speeds is in the form of a high speed pulse sufficient to assure good atomization. Because the accumulators are close together, accumulator charging and discharging is always complete at rotary distributor closing and the disturbing dynamic pressure effects produced in the injection lines and nozzles have no effect whatever on the metering events. Each of the working parts of the system is of simple construction and most of the parts have wide structural tolerances, so that the sum cost of the system is much less than the cost of old injection pumps, which have traditionally been very expensive devices.

If injection pulse shaping is required, the addition of adjustable throttling valves between the n accumulator chambers 3i and the nozzles produces excellent pulse shaping. Also, the continuous fuel metering device can be readily adapted with a pressure maximum to assure that fuel volume per injection pulse cannot exceed a certain set value.

Metered fuel flows into an accumulator chamber 1 which accumulates volume only above a certain pressure $p_1$ which is in intermittant contact through a rotary distributor with an accumulator 2 once between each injection pulse. Chamber 2 accumulates volume only above a pressure $p_2<p_1$, so that all fuel metered while accumulator 2 is in contact with accumulator chamber 1, as well as all volume stored in chamber 1 since the previous contact period, flows into chamber 2 during the 1–2 contact period. When chamber 2 is cut off from chamber 1, it is in intermittant sequential contact through a rotary distributor with one of the $n$ injection nozzle lines, each of which has an accumulator chamber **3*i* which receives the volume accumulated in chamber 2 and stores it at a pressure $p_{3i}$ less than $p_2$. The transferred volume in the chamber 3*i* is discharged through the $i$th injection nozzle. Accumulator chambers 1, 2, and 3*i* are constructed so that chamber volumes are invariant with pressures below pressures $p_1$, $p_2$, and $p_{3i}$. Therefore, variations in blowdown pressures between chamber 2 and the chambers 3*i* do not result in errors of the metering event, which occurs in the redundant interaction between chambers 1 and 2** and the continuous fuel flow metering system. The pressure cascading system has the advantage that so long as each injection nozzle $i$ has an adequate flow rate at a pressure below $p_{3i}$, the inequalities $p_1>p_2>p_{3i}$ hold, and the rotary distributor seals, the system produces excellent time series and cross section metering statistics over the full rage of operating speeds and over a wide range of the design parameters $P_{a1}$, $P_{a2}$, $P_{a3i}$, etc. Therefore, injection nozzles and injection line lengths need not be matched, and the system can operate at ultrahigh speeds.

The system can be modified to produce the desirable square wave pulse shape with a maximum fuel flow per degree crank angle.

The system is also adapted with pressure constraint means to assure that injected volume per pulse cannot exceed a set maximum to preclude overrichening.

IN THE DRAWING

Figure 6:
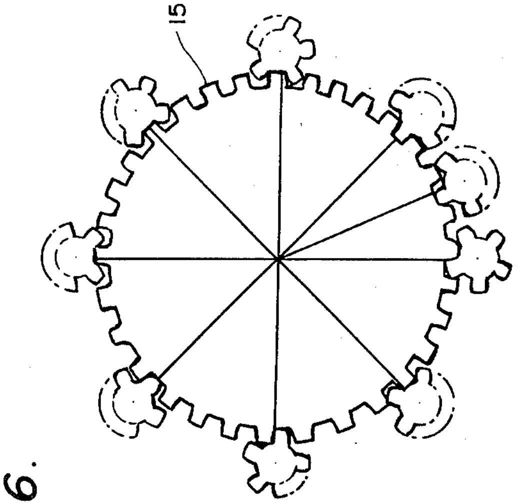
FIG. 6 shows the structure of a needle valve pulse shaping system for the injection system.
Figure 6A:
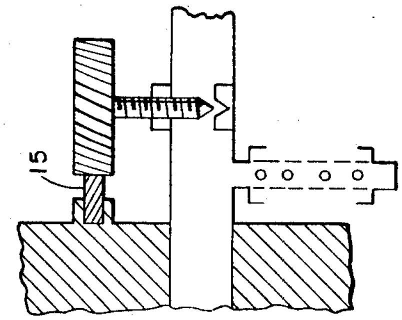

FIG. 6*a* is a section thru the pulse shaping needle valve.

Figure 7:
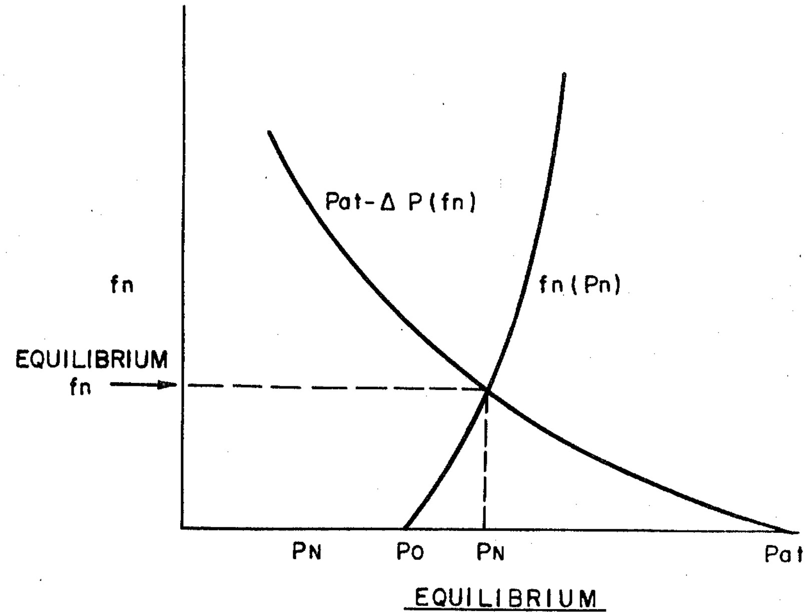

FIG. 7 illustrates the flow equilibrium behavior of the needle valve pulse shaping device in interaction with the nozzle and accumulator chamber 3*i*.

Figure 8:
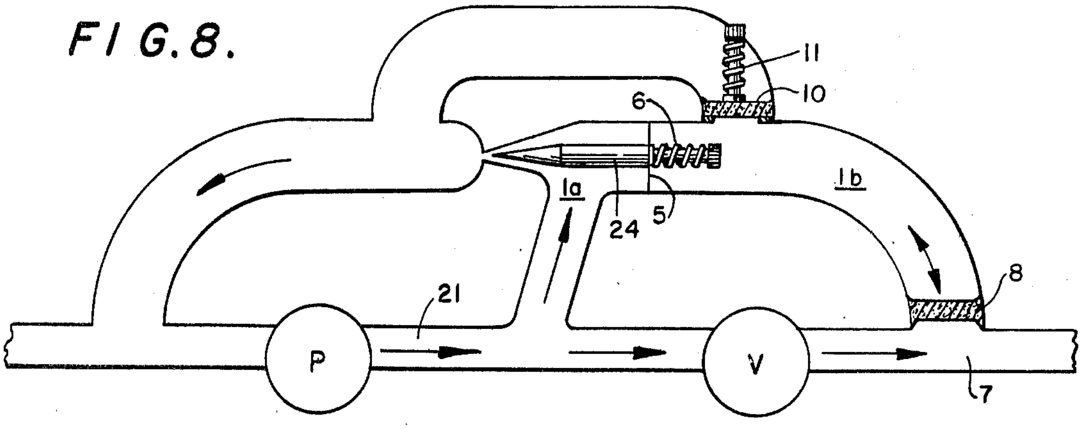

FIG. 8 shows a continuous flow fuel metering system adapted with a maximum pressure setting which, when attached to the pressure cascading device, assures that fuel volume per injection pulse cannot exceed a set maximum.

Chart 1 summarizes in table form the design requirements and the critical interrelations of the various components.

DETAILED DESCRIPTION OF THE INVENTION

Figure 1:
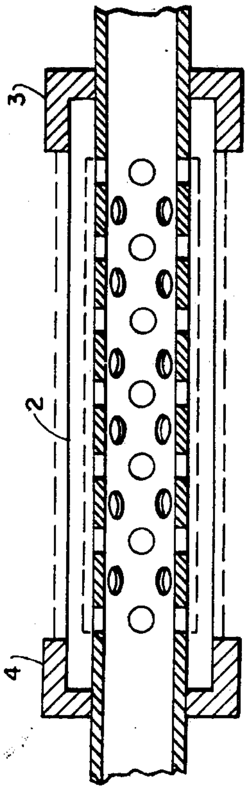
FIG. 1 shows the preferred form of accumulator device employed in the injection system.

Referring to FIG. 1, a piece of rigid metal tubing including holes in its walls is sheathed by a piece of flexible elastic tubing 2 (for instance commercially available high pressure nylon hydraulic tubing) which is under substantial strain tension and grips the tubing 1 normally with substantial force. Elastomer tubing 2 is sealed at the ends around rigid tube 1 by clamps 3, 4 so that it does not leak under internal pressure. The accumulator chamber formed by assembly 1, 2, 3, 4 has the characteristic that its fluid volume is invariant as long as its internal pressure is less than the gripping force on tube 1 generated by the strain tension of elastomer tubing 2; but when internal pressure exceeds this force, tubing 2 stretches still further and chamber volume increases with further increases in internal pressure. When internal pressure is again relaxed, the elastic tension of tubing 2 will force the accumulated volume out of chamber 1, 2, 3, 4. The chamber is a very simple example of a spring accumulator chamber with a mechanical stop where the elastomer tubing 2 serves as the distensible chamber and the spring, and rigid metal tube 1 serves as the stop. The accumulator chamber so formed reacts extremely quickly, can be designed using well known strength-of-materials formulas, and is both extremely durable and very inexpensive to manufacture.

The interaction of $2+n$ accumulators of the type shown in FIG. 1 forms the pressure cascade structure of this invention. Each of the accumulators has an accumulating pressure, below which its volume is invariant, which depends on the tension of the elastic tubing when it is against its inside tubing stop.

Figure 2:
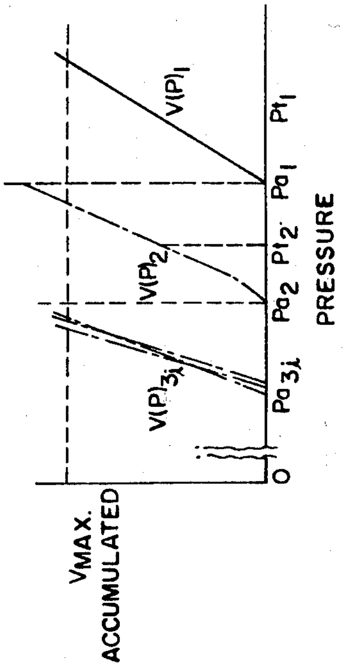
FIG. 2 shows the pressure-volume relation of the type of accumulator shown in FIG. 1, and illustrates the mathematical relations required between the accumulator chambers in the injection system.

FIG. 2 shows, in functions $v(p)_1$, $v(p)_2$, and $v(p)_i$, $i=1, 2, 3, \ldots n$, the sort of pressure-accumulated volume characteristics shown by accumulator chambers of the form of that of FIG. 1. Below a certain characteristic internal pressure $P_{a1}$, $P_{a2}$, $P_{a3i}$ accumulators 1, 2, 3*i* have a volume invariant with pressure. For each accumulator chamber, the chamber accumulates volume increasingly with pressure for pressures above this pressure $P_{aj}$. While dynamic efffects may cause the pressure-volume relations of the accumulators to depart to some degree from the functions of FIG. 2, it is a very good approximation, even at ultrahigh speeds, that the accumulators obey the relations shown both while pressure and volume are increasing and while pressure (and hence volume) are decreasing (accumulator blowdown). Suppose that chamber 1 has accumulated volume at a pressure $p_{t1}$ and suddenly comes in fluid contact with chamber 2 which is at an initial pressure below its accumulating pressure $p_{a2}$. As shown in FIG. 2, so long as the accumulated volume of chamber 1 is less than VMAX all of the accumulated volume of chamber 1 will be very quickly transferred to chamber 2, where it will be stored at lower pressure $p_{t2}$. Similarly, if chamber 2 with its accumulated volume (now closed off from chamber 1) comes in fluid contact with a chamber 3*i*, complete fluid transfer of accumulated volume from chamber 2 to chamber 3*i* will occur so long as accumulated volume of chamber 3 is not enough to drive its pressure up to $p_{a2}$.

Note that the volume versus pressure functions for the accumulators shown in FIG. 2 have the characteristic that, for the largest pulse volume the system is ever designed to produce, VMAX, the maximum possible pressure of chamber 3*i*, $p_{3i}MAX<p_2MAX<p_1MAX$ so that a pressure drop always exists between chambers 1 and 2 and between chamber 2 and any of the *n* chambers 3*i*. This pressure drop assures complete transfer of accumulated volumes between the accumulators toward the injection nozzles in the pressure cascading sequence.

This sequential transfer process of accumulated volume from higher pressure chamber to lower pressure chamber is complete and very fast, and does not depend (except at very fast speeds) on the exact values of $p_{a1}$, $p_{a2}$, and $p_{a3i}$ so long as $p_{a1}>p_{t2}>p_{t3i}$ to assure that the transfer occurs over a pressure drop. It is a pressure drop cascade transfer process.

This transfer process between accumulator chambers connected in sequence by a rotary distributor is the essence of the present invention. Accumulator chambers 1 and 2 are in intermittent contact and chamber 2 is in intermittent sequential contact with the *n* accumulator chambers 3*i* which feed the *n* nozzles. The pressure cascading transfer process filters the redundant metering cycle of the interaction of chambers 1 and 2 from any disturbing influences of variations between the various *n* injection lines and also assures that instantaneous flow velocities will be sufficient for atomization even under startup conditions, since the fuel flow pulses are produced by a sort of "capacitive discharge" technique. Since the cascading accumulator chambers can be physically close together, the high speed limitations due to finite sonic velocity in the fuel do not significantly hamper the operation or accuracy of the present device. If the various injection lines are not matched, metered pulses will have a variable lag in reaching the injection nozzles, but this phase shift does not effect the metering event itself.

Figure 3:
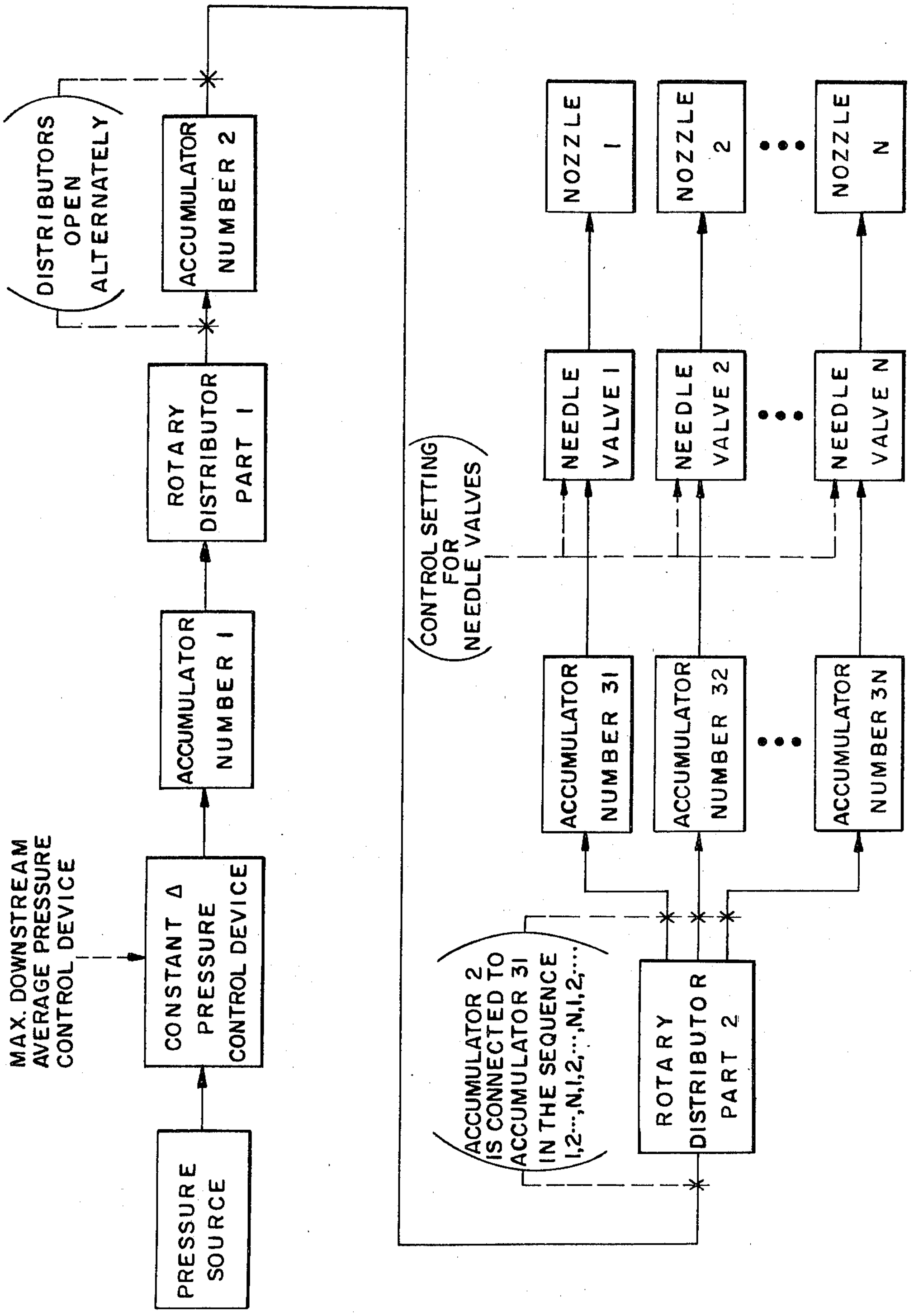
FIG. 3 shows the fuel flow sequence of the injection system in a block diagram.

FIG. 3 shows the fuel flow sequence of the injection system in a block diagram. Rotary distributors 1 and 2 are rotated in synchrony (probably on a common shaft) so that accumulator 2 is open alternately to accumulator 1 and one of the accumulators 3*i*.

Figure 4:
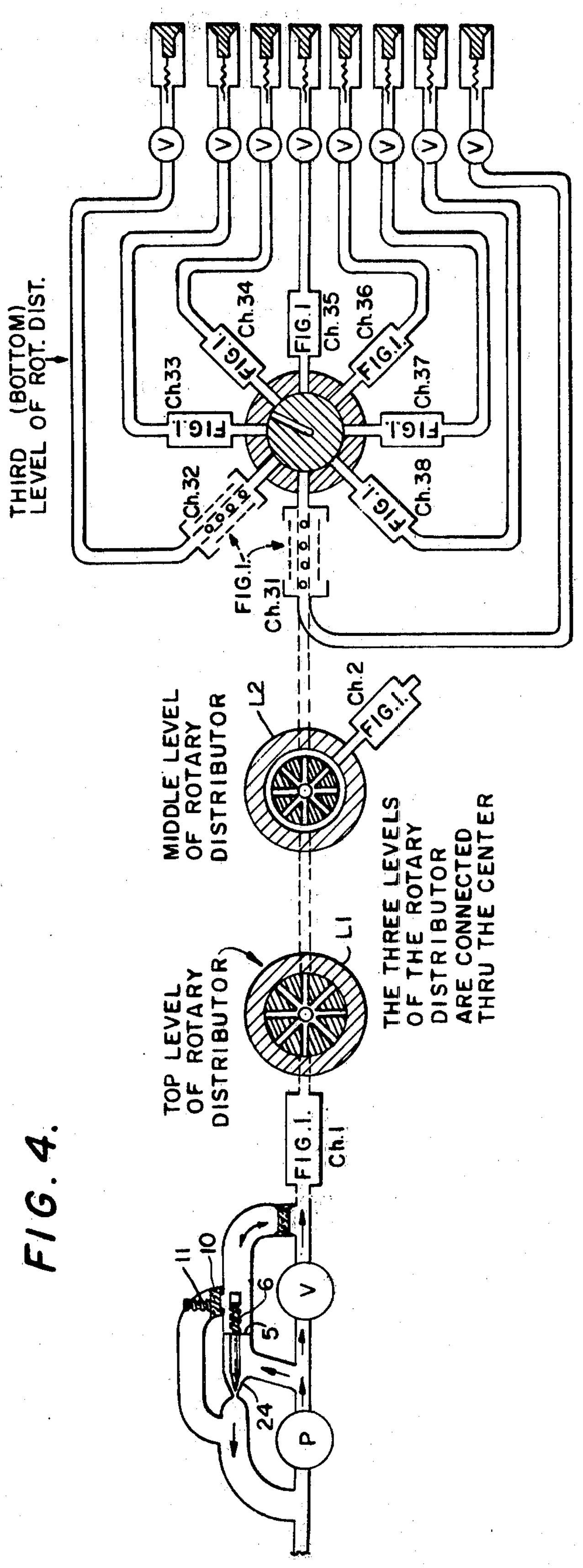
FIG. 4 shows a schematic diagram of the entire injection system.

FIG. 4 shows the injection system flow pattern schematically. Pressurized fuel from pressure source P is continuously metered through a flow control device comprising variable metering orifice V and diaphragm controlled bypass system 24, 5, 6 which maintains the average pressure drop across valve V at a constant value to assure accurate fuel metering at each setting of valve V. The flow control device has a bypass system 10, 11 which short circuits flow above a set maximum pressure downstream of valve V. This bypass assures that metered volume per injection pulse cannot exceed a set value.

Metered fuel flows to accumulator chambers 1 (ch1) and 2 (ch2): metered fuel is accumulated in chamber 1 when chamber 1 is cut off from chamber 2 by rotary distributor level 1 (L1) and when chamber 1 is connected to chamber 2 through rotary distributor level 1 fuel flows directly into chamber 2. Accumulator chamber 2 is always open to the flow passage of distributor L1 and L3 through always open distributor level 2 (L2), which is shaped so that the flow path between accumulators 1, 2 and 3*i* does not vary from injection cycle to injection cycle. During the part of each injection cycle, when chamber 2 is cut off from chamber 1 and the flow metering device, chamber 2 comes in contact (in rotary sequence through distributor L3 from injection cycle to injection cycle) with one of the *n* accumulator chambers 3*i*, and discharges all its accumulated volume into this chamber 3*i*. This process is always completed in the period of contact between chamber 2 and the chamber 3*i*. The accumulated fuel in chamber 3*i* is maintained at sufficient pressure to cause nozzle *i* to discharge at a high rate. The injection rate is reduced from this maximum rate and the fuel pulse is given the desired shape by the setting of needle valve *i* in line *i*, which is controlled along with other matching needle valves to control maximum injection rate as an increasing function of RPM (and perhaps other parameters).

After chamber 2 discharges into chamber 3*i*, contact between ch2 and ch3*i* is cut off by distributor L3 and fluid contact between ch2 and ch1 is again re-established through distributor L1. The cycle then repeats, this time producing injection in the next injection line.

Because the volume of chamber 2 after blowdown to the accumulator 3's does not change with variations in the pressures of the injection line chamber 3's (so long as $p_{3i}$MAX is less than $P_{a2}$) the metering event, which is the result of the redundant interaction between the continuous fuel metering system and chambers 1 and 2, is substantially unaffected by dynamic variations and other variations between the various injection lines. The only exception is due to the fact that the density of the fuel in chamber 2, as contact between ch2 and ch3*i* is closed, varies slightly with pressure because the bulk modulus of the fuel is not infinite. This effect is imperceptable in low pressure systems and is small even in ultrahigh pressure injection systems. Therefore, it is an excellent approximation to say that the metering of the system is unaffected by variations between the injection lines and nozzles. Metering accuracy does not, therefore, require that the flow characteristics of the lines and nozzles be closely matched.

Figure 5:
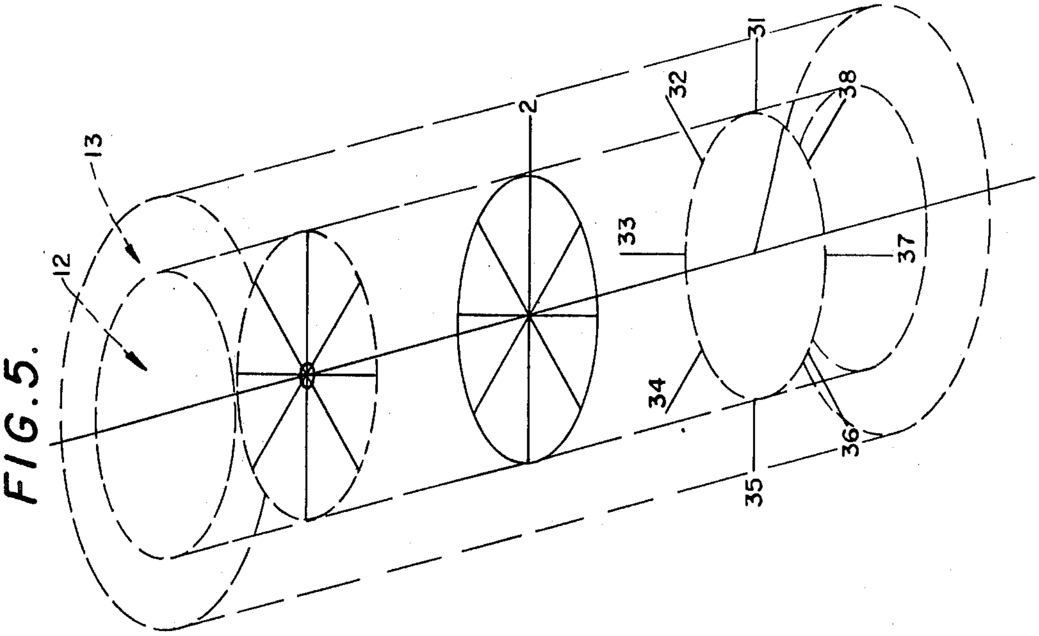
FIG. 5 shows a cutaway of a rotary distributor for the injection system.

FIG. 5 shows the flow pattern of the preferred form of rotary distributor. Cylindrically shaped rotary member 12 rotates in receiver 13, and the seal between rotor 12 and receiver 13 is so close that the assembly forms a fluid seal so that flow between accumulator ch1, accumulator ch2, and the accumulator chambers ch3*i* ($i$=1, 2, 3, . . . *n*) only occurs when the flow passages within rotor 12 line up with the passages in receiver 13 which feed these chambers. The rotary distributor has three levels, a top level which opens and closes contact with ch1 eight times per revolution with the flow passage in rotor 12, a middle level which has an annular slot around it so that accumulator 2 is always in fluid contact with the chamber of 12 and which is shaped so that the flow path lengths between chamber 2 and any of the chamber 3's is equal, and on the bottom level a flow passage which places one of the accumulator chamber 3's in contact with the passage in rotor 12 whenever flow between the passage in rotor 12 is cut off from ch1. The three distributor levels are interconnected by a hole in the center of rotor 12. Rotary distributors of the type shown in FIG. 5 have been successfully used in a number of injection systems employing rotary distributors.

Various other types of rotary distributors can be employed to perform the flow switching function between the accumulator chambers; many of these substitutable rotary distributors are obvious to those skillled in the art of rotary distributors.

In diesel engines and certan stratified charge engines not only the fuel metering, but also the fuel flow pulse shape is important. Generally the ideal pulse has the characteristic that it injects a certain fuel flow per degree crank angle at all speeds with the pulse flow in the general shape of a square wave, quickly reaching its maximum flow rate, maintaining this rate throughout the injection, and then cutting off fuel flow sharply. The present cascading injection pump device will not have these characteristics unless it is modified with a pulse shaping means.

This pulse shaping can be achieved by the apparatus shown in FIG. 6. In FIG. 6 each of the *n* injection lines has a variable area needle valve in the line between accumulator 3*i* and nozzle *i*, and the *n* needle valves are linked so that each has its orifice opening equal to that of the others. These needle valves are linked together through cog assembly 15 or some other linkage and are controlled with openings, an increasing function of RPM (control mechanism not shown).

Referring to FIG. 7, the flow $f_n$ characteristic of nozzle *i* (which is an outwardly opening pintle nozzle) is an increasing function of the pressure drop across the nozzle of the form: $f_n = k_1\ (p_n - p_d)^{1/2}\ (p_n - p_d - p_o)$ where:

$f_n$ = instantaneous nozzle flow rate $p_n$ = instantaneous pressure upstream of nozzle $p_d$ = instantaneous pressure downstream of nozzle $p_o$ = pressure drop for nozzle opening (on the approximation that nozzle opening pressure drop equals nozzle closing pressure drop)

$k_1$ = flow constant for nozzle geometry.

If $p_d$ and $p_o$ are constant, determining a nozzle flow rate means determining a nozzle pressure $p_n$.

The accumulator pressure of chamber 3*i* is always at least high enough for the maximum nozzle flow rate the system is designed to produce. To reduce flow from this maximum rate, the needle valve throttles the fluid pressure of accumulator $3i$ down to the pressure $p_n$ corresponding to the desired flow rate (which is proportional to RPM).

The pressure drop across the needle valve orifice is proportional to the square of flow velocity through the orifice (flow volume rate squared divided by orifice area squared)

$$\Delta p = \frac{k_2^2}{a^2} f_n^2$$

where:

$\Delta p$ = pressure drop across needle valve $f_n$ = instantaneous volume flow rate $a$ = cross sectional area of needle orifice opening $k_2$ = needle valve geometry flow constant.

Note that the pressure drop across the needle valve for any given volume flow rate is strongly related to needle valve setting $a$: this setting determines the equilibrium $p_n$ and the equilibrium nozzle flow rate $f_n$.

Specifically, the flow interactions of the nozzle, the accumulator, and the needle valve will react so that flow will oscillate around the equilibrium condition which has the general form.

$$p_n = p_{at} - \Delta p$$

or $$p_n = p_{at} - \frac{k_2}{a^2} f_n^2$$

where: $p_{at}$ = instantaneous pressure of accumulator $3i$. In the case of a system including an outwardly opening pintle nozzle, substituting for $f_n^2$, the equilibrium condition is:

$$p_n = p_{at} - \frac{k_1^2 k_2}{a^2}(p_n^3 - 3p_n^2 p_d - 2p_n^2 p_o + 3p_n p_d^2 + 4p_n p_d p_o + p_n p_o^2 - p_d^3 - 2p_d^2 p_o - p_d p_o^2).$$

This equilibrium is quite stable. The range of needle orifice opening $a$ required in an injection system is proportional to the flow range required times the square root of the desired range of needle valve pressure drops. For instance, if a constant maximum fuel flow rate per degree crank angle is required over a 10-fold RPM range (a 10-fold range of $f_n$) and the pressure drop range across the needle valve to attain that variation, given the variations of $p_{at}$ and $p_d$, is a 16-fold $\Delta p$ range, a 40-fold variation of orifice area from maximum to minimum flow setting is required. Note that this 40:1 variation of $a$ causes a 1600:1 variation in the negative feedback coefficient of nozzle equilibrium ($k_1^2 k_2/a^2$). In most practical cases the range of a required will be less than 40:1.

For properly chosen values of the design parameters $k_1$, $k_2$, $P_o$ and the accumulator pressure-volume function, the interaction of the accumulator, needle valve, and injection nozzle will produce an excellent approximation of the desired square wave pulse characteristic. The pulse shaping system is stable even at the highest operating speeds required.

FIG. 7 shows the equilibrium of injection rate $f_n$ between an accumulator chamber, a needle valve in the line, and an outwardly opening pintle nozzle on the assumption that nozzle downstream pressure $p_d$ and accumulator pressure $p_{at}$ are constant, to illustrate the function of the needle valve pulse shaping apparatus.

The pulse shaping with the needle valve apparatus will not effect the metering accuracy of the accumulator chamber pressure cascade process because injection pulse duration is much less than the period between successive injections of the same line, so that each chamber $3i$ is blown down completely when it makes initial contact with accumulator chamber 2 through the fluid distributor.

Variations in the pressure-volume characteristics of the $n$ accumulator chambers $3i$, the $n$ nozzles, and the $n$ needle valves, as well as line length variations, will produce variations in the pulse characteristics of the injection lines. However, if design parameters are reasonably well matched, pulses will also be matched and each nozzle will have the desirable square wave pulse shape.

The needle valve pulse shaping technique will produce a better approximation to the ideal square wave injection characteristic than conventional injection pumps, because the system does not involve plungers with inertial mass or cam profiles which constrain the pulse shape.

FIG. 8 shows a continuous flow fuel metering system adapted to the injection system. Fuel is metered continuously through a metering valve V where the average pressure drop across the metering valve is held constant (as long as downstream pressure is below a set maximum) by a diaphragm controlled bypass valve assembly.

Fuel pressurized at pump P flows into line 21, where flow is divided between fuel flow to the engine through metering valve V or flow to a flow bypass through needle valve assembly 24. Needle valve assembly 24' is opened and closed by diaphragm 5 which opens if the pressure in chamber 1$a$ exceeds the pressure in chamber 1$b$ plus the pressure of spring 6, and closes if pressure in chamber 1$a$ is less than the pressure in 1$b$ plus spring 6's pressure, so that the average pressure drop across which metering valve V meters is maintained at a pressure drop corresponding to the force of spring 6. Spring 6 is designed with a ratio of spring constant to actuating force such that its force on diaphragm 5 is nearly the same when bypass valve assembly 24 is fully open as when it is fully closed.

Chamber 1$b$ is connected with line 7 at the downstream pressure of valve V through porous plug 8. Flow through plug 8 is quite restricted and quick pressure variations therefore cannot be transmitted (since pressure transfer requires fluid flow: the fuel bulk modulus is not infinite). Flow over the system pressure cycle through plug 8 serves to maintain chamber 1$b$ at the average (cycle average) pressure of line 7. Since the pressure in line 7 fluctuates quite rapidly with the opening and closing of accumulator 1 to accumulator 2, and since oscillation of the metering device would produce unacceptable cycle-to-cycle metering errors at the very high operating speeds required, the porous plug's function of suppressing servo-oscillation of the bypass system is important. The system cannot be built so as to maintain a constant instantaneous pressure drop across valve V so the system is instead designed to maintain an average pressure drop very closely from cycle to cycle.

As shown in FIG. 2, the interaction between the accumulator chambers 1 and 2 is such that a certain average cycle pressure in line 7 will correspond to a certain fuel flow per injection pulse. The reader can convince himself of this relation between average pressure in line 7 and fuel volume per pulse by examining the pressure-accumulated volume relations in FIG. 2. Therefore, setting a maximum allowable average pressure in line 7 sets a maximum fuel volume per injection pulse which is substantially independent of RPM. Pressure override bypass 10, 11 in FIG. 8 achieves this. Stop 10 opens if the average pressure in chamber 1*b* exceeds the force of spring 11: the reduction of pressure in chamber 1*b* causes diaphragm 5 to open bypass valve 24 further, reducing system pressure. The system therefore cannot maintain an average pressure in line 7 in excess of the set opening pressure of bypass system 10, 11. Therefore, fuel volume per injection pulse cannot exceed the set value corresponding to this maximum average pressure in line 7.

The structure of FIG. 8 can be modified in various ways to adapt it to requirements as, for instance, to adapt the system to very high injection pressure. Diaphragm 5 can be replaced by a piston assembly to control the opening and closing of the bypass system: this adaptation of pressure compensated fluid metering systems is well known to the fluidic art and is particularly well adapted to very high pressure drops across metering valve V. High pressure drops are advantageous for certain systems, since it is important that the pressure drop across valve V should never change direction. The pressure averaging effect of porous plug 8 could instead be served by an orifice between line 7 and chamber 1*b* which was exceptionally small, to limit the maximum fluid transfer rate between chamber 1*b* and line 7 and so serve to limit the rate of pressure equalization between the two chambers. These and other modifications of the continuous fuel metering system will suggest themselves to those skilled in the fluidic arts, where a large literature of precise continuous metering exists.

The metering accuracy of the device shown in FIG. 8, or of any pressure compensated metering device, will be diminished if the pressure in chamber 1*a* fluctuates out of phase with the injection metering events. It is best if the pressure upstream of valve V is kept constant (over time periods of the order of a few cycles). This can be accomplished with a number of well known techniques such as placing a surge tank between pump P and valve V, or by placing a properly chosen length of elastic tubing between the pump and the metering and bypass systems. The elastic tubing technique has the advantage that it need accumulate less volume before achieving desired pressure changes.

Other continuous metering means may be substituted for the device of FIG. 8 to accomplish the continuous flow metering prior to the pressure drop cascade distribution system. For an example, flow may be metered by some variable displacement pump. A number of continuous fluid metering devices will serve the purpose of the device of FIG. 8, and the least expensive durable one is the best.

Chart 1 at the end of the drawings summarizes the design requirements and functions of the components of the injection system in tabular form. Note that the design tolerances of most of the components of the system are quite wide: the rotary distributor is the only component of the system which must be built to very close structural tolerances for sealing purposes. Note also that the component requirements of the system are very similar whether the system operates at an injection pressure of 50 psi or 10,000 psi, and that the production cost difference between a high and a low pressure system is mainly due to the increasing cost of pumps with increasing pressures.

In chart 1, note that each of the working parts has a geometrically simple shape and a mathematically well defined function, that each part's function is simple, that sources of interaction between parts which produce second order metering errors are eliminated (equilibriums between the parts are sequential rather than simultaneous) and that the distances of fluid pressure wave travel between the metering parts are so small that the desired interactions between the metering parts are always complete in the time available.

In the claims, terms recur which need to be understood unambiguously. A "repeating sequence having a fixed ratio between transfer steps" is a sequence which recurs at fixed periodic intervals (for instance, as a function of rotation of some driveshaft mechanism or other driving mechanism). Although the speed at which the device operates can be variable (for example, in an engine speed may vary over about a factor of 10) if a complete repeating cycle of the device is plotted as a function of angle $\theta$ (as is customary in describing periodic functions, even when no rotating member is involved) under conditions where the angular velocity $d\theta/dt$ is constant, the repeating sequence will be understood to have a fixed ratio between transfer steps if, on successive cycles (with rotational velocity constant) the same transfer or other event occupies the same time interval.

In the claims, certain notations borrowed from mathematics are used for clarity (for example, the subscript notation $N_{xi}$ where $i$=1, 2, 3, . . . $n$). The mathematical use of these notations is conventional and unambiguous, and permits the claims to be drafted in more compact form.

CHART NO. 1

COMPONENTS: THEIR FUNCTION AND DESIGN REQUIREMENTS IN THE SYSTEM

| | Component(s) | Function | Comments |
|---|---|---|---|
| I. | Pump | Produce adequate volume per revolution at adequate pressure. Pressure should be smooth: Will need surge tank or elastic line to average pressure before metering. | Pump has pressurizing function but no metering function. Some pump leakage tolerable so long as pressure and volume adequate. |
| II. | System housing | Must be adequately incompressible. No leakage between chambers or flow through any but designed paths. | Volumes and surface finish not critical. Seals and incompressibility critical. |

-continued

CHART NO. 1
COMPONENTS: THEIR FUNCTION AND DESIGN REQUIREMENTS IN THE SYSTEM

| | Component(s) | Function | Comments |
|---|---|---|---|
| III. | Constant average Δp bypass system: 1. diaphragm 2. Δp spring 3. diaphragm controlled needle valve to bypass 4. porous plug | Maintain a constant average pressure drop across fuel metering valve by controlling flow through bypass system. Negative feedback servo: dynamically stable. | Stability critical Porous plug suppresses oscillation. Want Δp spring to vary force little from full open to full close of bypass valve needle. Errors go as square root of Δp. Fluctuating pressures follow a redundant cycle. |
| IV. | Metering valve | Meters fuel across constant average pressure drop Δp. Fuel supplied to engine a unique function of valve setting over wide range of RPM. | Control is easier if flow through valve (p=constant) is linear with control setting. |
| V. | Accumulator chambers | Volume of accumulator chamber i, $v_i$ ($p_i$, ...) obeys conditions. $\frac{\delta_v}{\delta_p} = 0$ if $p_i < p_{ai}$ $\frac{\delta_v}{\delta_p}$ sufficiently large if $p_i > p_{ai}$ | Volumes must be invariant below accumulator pressures or cross-product errors due to variations between injection nozzle lines result. Volumes accumulated above $p_{ai}$ must always be sufficient so pressure drop is never in the reverse of the cascading direction. Chambers must accumulate very fast and discharge very fast (elastic tube type does this). |
| VI. | Rotary fluid distributor | Switches on and off contact in sequence between successive accumulator chambers in the pressure cascade. Angles between successive distributor line opening and closing events should be equal. Distributor should open and close positively. Distributor should not leak fuel to closed lines. | Switching on rotary distributor similar to that on present injection systems. Specs on distributor tight. Distributor most likely cause of time series and cross section metering errors. Radial symmetry makes close tolerances relatively easy, and running seals can be maintained. (Proper fuel filtration required for durability.) |
| VII. | Pulse shaping needle valves in each injection line between the accumulator 3's and the nozzles (optional) | Needle valves controlled to open and close so restriction equal in each injection line. Restriction sets maximum equilibrium injection rate through nozzles in conjunction with flow parameters and variables as described in specification. | Generates desirable square wave type pulse shape. Orifice does not have to move during injection event so device functions at speeds limited by the rate at which fluid equilibrates. Very stable, very fast. Want needles adjusted to maintain max. fuel flow per degree crank angle nearly constant over the operating range of RPM. Variations in injection line length produce phase shift in pulse but pulse shape varies little. Pulse shaping does not effect the fuel metering of the injection system. |
| VIII. | Injection lines | Must be effectively incompressible below a pressure comfortably above nozzle opening pressure. | |
| IX. | Injection nozzles | Must have an opening pressure and a flow rate which increases with pressure with flow rate as high as is ever required at a pressure below $P_{3i}$ for each nozzle i. Variations in nozzle function effect pulse shape and fuel flow rate per given line needle orifice opening. | Nozzles need not be matched for fuel metering purposes, but must be reasonably well matched if matched pulse shaping is important. |

We claim:

1. In a fluid metering system pumping an effectively incompressible fluid from a supply passage at a variable pressure $p_m$ into one or more downstream receiving passages, wherein each of said receiving passages has an internal fluid pressure ranging below a set positive pressure $p_r$, where $p_m$ is always greater than $p_r$ during the operation of said metering system the method of totally eliminating the effect of variations in the pressure of the fluid in the receiving passage(s) on the flow of fluid between said supply passage and said receiving passage(s) by transferring fluid from said supply passage to said downstream passage(s) in a repeating sequence having a fixed ratio between transfer steps, said method comprising the repeating sequence of a. bringing said supply passage into flow contact with a transfer passage which transfer passage has the property that the fluid containing volume of said transfer passage varies directly with internal fluid pressure above a set fluid pressure $p_a$ (where $p_a$ is less than $p_m$ and $p_a$ is greater than $p_r$) and where the volume of said transfer passage is substantially invariant with variations of internal fluid pressure below pressure $p_a$, said fluid contact between said supply passage and said transfer passage occurring at a time in said repeating sequence when said transfer passage is cut off from fluid contact with any receiving passage, whereby said transfer passage will expand in a time period under one second to an internal volume corresponding to said internal pressure $p_m$ b. cutting off fluid contact between said supply passage and said transfer passage c. establishing fluid contact between said transfer passage and a receiving passage at pressure less than $p_r$, whereby the transfer passage will discharge volume into said receiving passage until said transfer passage is at its minimum volume corresponding to an internal pressure less than or equal to $p_a$, the aforesaid transfer passage discharge process occurring in a period of less than 1 second d. cutting off fluid contact between said transfer passage and the said receiving passage, e. reestablishing fluid contact between said transfer passage and said supply passage at an internal pressure greater than $p_a$, whereby fluid from said supply passage flows into said transfer passage in a period less than one second to displace the volume of said transfer passage volume increase corresponding to the increase in pressure between $p_a$ and $p_m$ f. cutting off fluid contact between said transfer passage and said supply passage g. reestablishing fluid contact between said transfer passage and a receiving passage.

2. A timed, pulsed incompressible fluid metering system which injects fluid pulses into $n$ receiving passages in a repeating sequence having set ratios of time between events on successive cycles comprising:

a. means to supply pressurized fluid to a supply passage b. a supply passage c. an accumulator chamber ch2 d. $n$ receiving passages denoted pass1, pass2, pass3 . . . pass$n$ e. first switching means to open and close fluid flow between said supply passage and said accumulator chamber ch2 and a second switching means to open and close flow between ch2 and receiving passages pass1–pass$n$ in succession; where said first and second switching means open and close fluid contact between the passages and accumulator chamber ch2 in the repeating sequence supply passage-ch2, ch2-pass1, supply passage-chz ch2-pass2, supply passage-ch2, ch2-pass3, . . . supply passage-ch2, ch2-pass$n$, supply passage-ch2, ch2-pass1, . . .

f. where accumulator chamber ch2 has an internal fluid volume versus internal pressure function $v(p)$ such that $dv/dp$ equals zero if internal pressure $p$ is less than a set positive pressure $p_a$, where $dv/dp$ is large if internal pressure $p$ exceeds set pressure $p_a$, where the pressure of the said supply passage exceeds $p_a$ and the pressure of the receiving passage(s) is less than $p_a$ during operation of the said metering system g. and where the number of receiving passages $n$ may be any number including 1.

3. The invention as stated in claim 2, and wherein said supply passage has in internal fluid volume versus internal fluid pressure function $v_s(p)$ such that $d\ v_s/d\ p$ is relatively large for a range of internal pressures above the said set positive pressure $p_a$.

4. The invention as set forth in claim 2, and wherein each of the $n$ receiving passages denoted pass1, pass2, pass3, . . . pass$n$ includes an accumulator chamber 3$i$ (where $i$ equals 1, 2, 3, . . . , $n$ denoted ch31, ch32, ch33, . . . ch3$n$)

where each accumulator chamber 3$i$ ($i$ = 1, 2, 3, . . . $n$) has an internal fluid volume versus internal pressure function $V_{3i}$ ($P_{3i}$) such that $d\ V_{3i}d\ p_{3i}$ equals zero if internal fluid pressure $p_{3i}$ is less than a set positive pressure $p_{a3i}$, and such that $d\ V_{3i}/d\ p_{3i}$ is large if internal pressure $p_{3i}$ exceeds said set positive pressure $p_{a3i}$, and where the set pressures $p_{a3i}$ ($i$ = 1, . . . $n$) are each less than the set pressure $p_a$ of said accumulator chamber ch2.

5. In a fluid metering system pumping an effectively incompressible fluid from a supply passage operating at a fluid pressure above a set positive pressure $p_a$ into a receiver passage operating at a fluid pressure below said set pressure $p_a$ the method of totally eliminating the effect of variations in the fluid pressure in the receiver passage on the pressure of said supply passage comprising the repeating steps of:

a. bringing said supply passage into flow contact with a transfer passage which has the property that the fluid containing volume of said transfer passage varies directly with internal pressure above said set fluid pressure $p_a$ and where the fluid containing volume of said transfer passage is substantially invariant with variations in internal fluid pressure below said pressure $p_a$, said fluid contact between said supply passage and said transfer passage occurring at a time in the repeating sequence of steps when said transfer passage is cut off from fluid contact with said receiving passage and is sealed off from flow to any passage except said supply passage, whereby said transfer passage will expand and receive fluid from said supply passage which supply passage operates at a fluid pressure greater than said set pressure $p_a$ b. cutting off fluid contact between said supply passage and said transfer passage at a time when said transfer passage is cut off from flow to any passage except said supply passage c. establishing fluid contact between said transfer passage and said receiver passage, whereby the transfer passage will completely discharge its accumulated fluid volume into said receiver passage as said transfer passage contracts to its minimum internal fluid volume corresponding to the receiver passage pressure less than $p_a$ wherein said repeating sequence of transfer steps occur in a repeating sequence where transfer steps bear a set time ratio to one another between successive cycles of fluid transfer.

* * * * *